Figure 1:
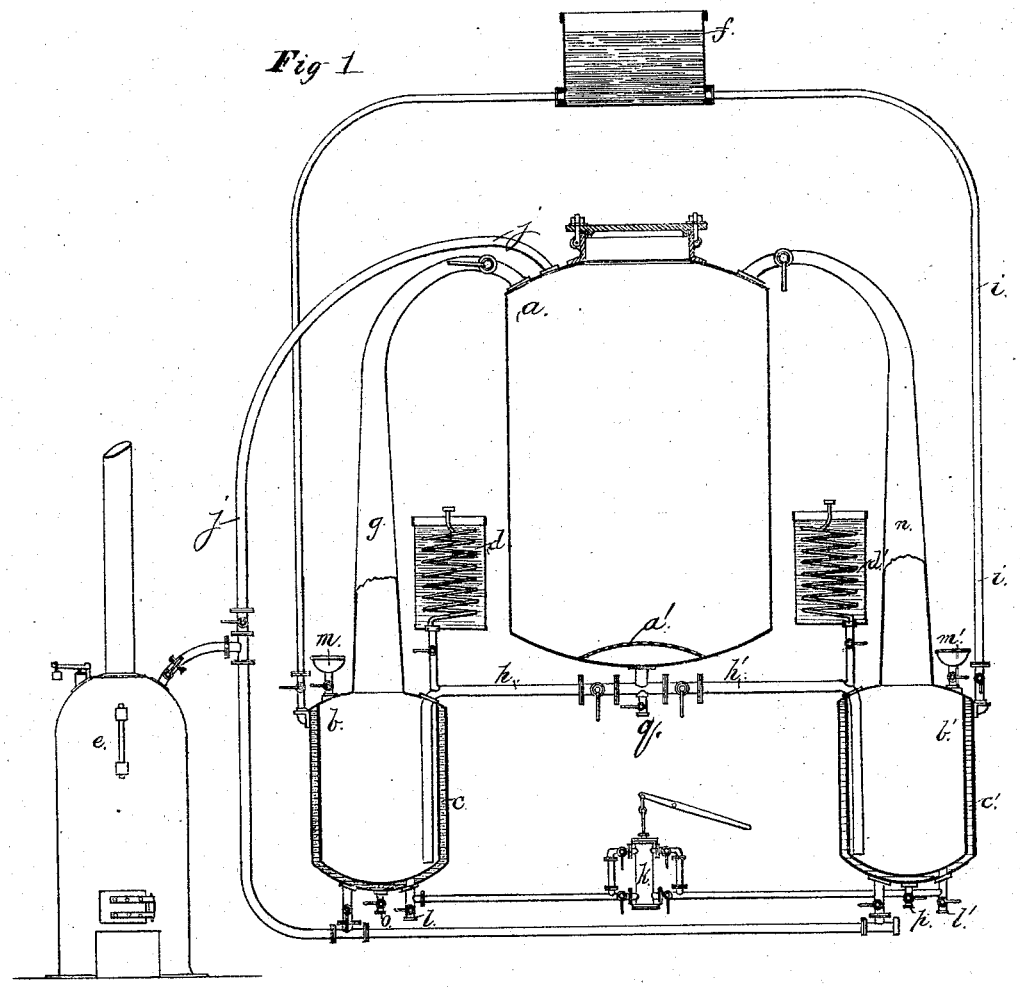

R. SCAIFE.
Apparatus for Extracting the Oleaginous Matter from Textile Material.

No. 160,550. Patented March 9, 1875.

Witnesses.
Geo. V. Smallwood
W. R. Edelen

Inventor:
Reginald Scaife
by John J. Halsted,
Atty

UNITED STATES PATENT OFFICE.

REGINALD SCAIFE, OF LONDON, GREAT BRITAIN.

IMPROVEMENT IN APPARATUS FOR EXTRACTING THE OLEAGINOUS MATTER FROM TEXTILE MATERIAL.

Specification forming part of Letters Patent No. 160,550, dated March 9, 1875; application filed November 10, 1874.

*To all whom it may concern:*

Be it known that I, REGINALD SCAIFE, of London, Great Britain, have invented improvements in the method of and means for extracting oleaginous, fatty, and resinous matter from textile materials, whether animal or vegetable, and from other substances, of which the following is a specification:

These improvements relate to a method and means for extracting oleaginous, fatty, and resinous substances from animal and vegetable substances, textile materials, raw and manufactured, seeds, or their envelopes or cases, by the use of alcohol, wood-spirit, or naphtha, bisulphide of carbon, various ethers, and light hydrocarbons employed in the state of vapor, and at and above the temperature of their respective boiling-points. The invention consists in the construction, connection, and joint operation, as hereinafter more particularly set forth.

The material from which the oleaginous, fatty, or resinous substances are to be extracted is inclosed in a suitable closed vessel, and the material to be vaporized is also inclosed in a suitable vessel, heated, preferably, by means of steam to the desired temperature. The vapor of the spirit is led by pipes to the upper part of the closed vessel holding the material to be operated upon, from whence, forcing itself by its pressure, it passes down through the material, carrying with it the substances to be extracted.

When the operation has been continued long enough to purify the material, which depends upon the kind of material and its degree of impurity, the operation is stopped. Then, to remove the last traces of the vapor, I pass steam, warm air, or warm gases, which is an important feature of my invention. Lastly, the material is drawn out of the closed vessel and another charge placed therein.

The vapors, which condense partially in their passage through the material, are received, together with the accompanying matters to be extracted, into a condensing-vessel, where the spirit is either drawn off or the materials conveyed to a still and separated; or the materials may be conveyed to the first evaporating-vessel named, for the further production of the spirit-vapor.

It is obvious that the method here indicated may be carried out in a variety of ways; but I will describe the form of apparatus I prefer to employ, and which I especially claim as entirely new and original; and I will describe it with the accompanying drawing in an elevation of the apparatus developed, without reference to convenience of arrangement, which nearly always depends upon local convenience.

$a$ is a vessel, in iron or other suitable material, with a movable cover, retained in place by screws or other fastenings, for holding the material to be operated upon, provided with a perforated false bottom, $a'$, covered with wire-gauze or other suitable material. For the convenience of filling and emptying I prefer to put the material in a kind of cage, by which the whole charge can be placed in and withdrawn from the vessel by means of a crane or other lifting power. The cover is then full diameter of vessel. $b\ b'$ are the closed vessels for the spirit to be vaporized in, or to be condensed in. Each of these vessels is provided with a steam-jacket, $c\ c'$, through the inclosed space between which and the vessel $b\ b'$ steam is passed to vaporize the spirit, or cold water, if either of the vessels is to be used as a condenser. To each of these vessels is also fitted, for use in certain cases, an external coil of pipe, $d\ d'$, to act, by its surface condensation, as a condenser or safety-tube; and, if necessary, this may be surrounded by a vessel filled with cold water. $e$ is a steam-boiler, by which the apparatus is heated, and $f$ is a cistern of cold water to supply the condensers. Sets of steam-pipes are also, in connection with the upper part of the vessel $a$, for the purpose of passing steam through the material to be cleansed—a matter of great importance in some cases, as, for instance, in cotton-waste. The cocks shown in the drawing on the courses of the pipes will perfectly explain the means whereby the several communications described are to be effected.

The operation of the apparatus is thus: Presuming that soiled and greasy cotton-waste from the factories is to be the material to be operated on, the vessel $a$ is filled with the charge, (about one ton,) and the cover screwed down. The charge of spirit is let into the vessel $b$ by the funnel $m$. Then the steam from the boiler is let into the jacket of $b$. The vapor then rises by the pipe $g$ to the top of the vessel $a$, and, passing down the material, carries the oil with it, by the pipe $h'$, into the vessel $b'$, kept cool by the flow of water from $f$ by the pipe $i$ to the jacket of $b'$. When the operation is finished—usually in about six hours—the communication from the vaporizer is closed, and steam is admitted to $a$ by the pipe $j$ for a short time. Then the inlet of steam is stopped, the cover of $a$ removed, and the clean cotton-waste extracted and a new charge placed therein. The process is now reversed as to $b$ and $b'$, steam being admitted to the jacket of $b'$ and cold water to the jacket of $b$, which becomes the condenser, and $b'$ the vaporizer, conveying its spirit-vapor to $a$ by the pipe $n$, and so the operation continues. The operation of drawing off the oily matters is effected by the taps $l$ and $l'$, to be purified in the ordinary methods. $o$ and $p$ are the taps for the escape of condensed steam, and $q$ is the trial-tap, to show when the operation is finished.

In certain cases there is an advantage in employing the force or lift pump shown at $k$, to draw the liquid or vapor from $b$ to $b'$, or vice versa, and the pump can be driven by hand or power, as most convenient.

I claim—

1. In an apparatus for extracting oleaginous, fatty, or resinous matter from the materials named in the specification, a closed vessel, $a$, for holding such materials, communicating with other vessels, $b\ b'$, in which the spirit-vapors are condensed, the vapors passing into the top of $a$, and down through the material therein, and out of the bottom of the vessel to the condenser, substantially as shown and described.

2. The combination, with the closed vessel $a$, of the vessels $b$ and $b'$ and their connecting-pipes $n\ g$, and a pump for increasing the circulation, substantially as described.

3. The combination, with the vessel $a$, of the vessels $b\ b'$, pipes $n\ g$, boiler $e$, pipe $j$, cistern $f$, and pipe $i$, as and for the purposes described.

REGINALD SCAIFE.

Witnesses:
G. S. REEKNELL,
WM. MORGAN BROWN.